United States Patent
Hietala et al.

(10) Patent No.: US 12,460,047 B2
(45) Date of Patent: Nov. 4, 2025

(54) SILANE MODIFIED POLYESTER COMPOSITION

(71) Applicant: Brightplus Oy, Oulu (FI)

(72) Inventors: Maiju Hietala, Oulu (FI);
Rauna-Leena Kuvaja, Oulu (FI);
Jarkko Leivo, Oulu (FI)

(73) Assignee: Brightplus Oy, Oulu (FI)

( * ) Notice: Subject to any disclaimer, the term of this patent is extended or adjusted under 35 U.S.C. 154(b) by 181 days.

(21) Appl. No.: 18/038,048

(22) PCT Filed: Nov. 26, 2021

(86) PCT No.: PCT/FI2021/050818
§ 371 (c)(1),
(2) Date: May 22, 2023

(87) PCT Pub. No.: WO2022/112660
PCT Pub. Date: Jun. 2, 2022

(65) Prior Publication Data
US 2023/0407000 A1   Dec. 21, 2023

(30) Foreign Application Priority Data

Nov. 27, 2020 (EP) .................................... 20397514
Nov. 27, 2020 (FI) .................................... 20206213

(51) Int. Cl.
C08G 63/08 (2006.01)
B29C 48/00 (2019.01)
B29C 48/40 (2019.01)
B29K 67/00 (2006.01)
B29K 83/00 (2006.01)
B29L 31/00 (2006.01)
C08G 77/18 (2006.01)

(52) U.S. Cl.
CPC ............. *C08G 63/08* (2013.01); *B29C 48/022* (2019.02); *B29C 48/40* (2019.02); *C08G 77/18* (2013.01); *B29K 2067/046* (2013.01); *B29K 2083/00* (2013.01); *B29K 2995/0059* (2013.01); *B29L 2031/712* (2013.01)

(58) Field of Classification Search
CPC ......................... B29K 2067/046; C08L 83/10
See application file for complete search history.

(56) References Cited

U.S. PATENT DOCUMENTS 9,109,083 B2   8/2015  Kuo et al.
2009/0312501 A1*  12/2009  Webb .................. C08G 77/445
525/444

(Continued)

FOREIGN PATENT DOCUMENTS

EP       3385329 A1    10/2018
JP     2016026254 A     2/2016

*Primary Examiner* — Randy P Gulakowski
*Assistant Examiner* — Holley Grace Hester
(74) *Attorney, Agent, or Firm* — Laine IP Oy (57) ABSTRACT

The present invention concerns a method for forming a silane modified polyester composition. In addition, the invention concerns a silane modified polyester composition obtained by such method and use of such composition. In particular, the present invention concerns a method comprising subjecting polyester blend and polysiloxane mixture to react through reactive extrusion in a melt compounding process to form a silane modified polyester composition.

17 Claims, 2 Drawing Sheets

(56) References Cited

U.S. PATENT DOCUMENTS

| | | |
|---|---|---|
| 2010/0167048 A1 | 7/2010 | Kuo et al. |
| 2011/0313114 A1 | 12/2011 | Soyama et al. |
| 2016/0009913 A1 | 1/2016 | Misra et al. |
| 2019/0062495 A1 | 2/2019 | Meng et al. |

* cited by examiner

SILANE MODIFIED POLYESTER COMPOSITION

BACKGROUND OF THE INVENTION

Field of the Invention

The present invention concerns a method for forming a silane modified polyester composition. In addition, the invention concerns a silane modified polyester composition obtained by such method and use of such composition.

Description of Related Art

For several years, researchers have been working to develop environmentally friendly sustainable alternatives for petroleum-based non-biodegradable polymers such as acrylonitrile butadiene styrene (ABS). To increase the bio-based content of the materials, petroleum-based polymers are typically blended with bio-based polymers. In addition, there has been research to develop completely bio-based polymers with similar or better properties than petroleum-based commodity plastics.

Polylactic acid (PLA) is widely researched bio-based polymer that has high strength and high modulus. However, PLA also has some limiting properties, such as brittleness, poor thermal stability, low elongation at break, poor melt strength and moisture sensitivity that prevent its use in a broader spectrum of applications. Thus, there has been a lot of research for how to improve PLA properties. Investigation has included for example adding small molecular plasticizers, blending with other ductile polymers, copolymerization, and nanocomposites to improve the toughness and ductility of PLA and other corresponding materials. These strategies have indeed resulted in increased ductility and toughness, however, often at cost of decreased strength and moduli.

In addition, inorganic reinforcing materials, inorganic powders, or fibers, such as glass fibers, minerals and clays, have been added to a polymer base to improve the strength and impact resistance of the polymer material. However, even dispersion of such materials to the material base is difficult. Different surface treatment techniques can be used to improve materials compatibility; however, they can make the process difficult and large-scale production uneconomic.

Patent publication US20160009913A1 describes a high-performance acrylonitrile butadiene styrene (ABS) polymer blend comprising ABS, polylactic acid (PLA), an acrylic copolymer-based lubricant and a polymeric chain extender. This kind of blending can improve the material properties; however, recycling of such material is difficult if not impossible.

Patent publication US20190062495A1 describes a silane-modified polyester blend comprising a polyester polymer homogeneously blended with silane molecules containing two or three alkoxy groups bound to the silicon atom. The polyester blend is prepared by first dissolving a solid polyester into an organic solvent in which the polyester and silane are both soluble. The silane can then be dissolved into the solution containing the polyester. However, solvents used here in, such as methylene chloride and chloroform, are harmful for human health.

Patent publication U.S. Pat. No. 9,109,083B2 describes a process for preparing a PLA resin article from the PLA composition, the process comprising blending under a weak acidic condition PLA resin, at least one modifier selected from at least one metal/nonmetal alkoxide and at least one metal/nonmetal alkoxide having at least one functional group capable of reacting with the PLA resin, or a mixture thereof. System requires a first catalyst, and optionally, a second catalyst.

Accordingly, there is a need for bio-based sustainable alternative for conventional plastics, such as ABS, that is preferable recyclable and has good chemical resistance.

SUMMARY OF THE INVENTION

The present invention aims at solving at least some of the problems of the prior art.

It is an object of the present invention to provide a chemically modified, bio-based and sustainably sourced materials that can be used in versatile applications, for example as injection moulded articles, such as consumer products, packaging materials, car parts or electronic casings. Due to their improved chemical resistance, especially moisture resistance, and mechanical properties, the materials produced by the method of the present invention are more recyclable than basic bioplastics.

Thus, the present invention relates to a method for providing a new kind of, preferably bio-based, silane modified polyester composition. The composition is obtained by mixing a polyester blend with a polysiloxane mixture and reacting these with each other through reactive extrusion in a melt compounding process.

Reactive extrusion offers a flexible alternative to polymerization in the presence of a solution or a like. Traditionally, reactive extrusion is accomplished using twin screw extruders to melt, homogenize, and pump thermoplastic polymers. Reactive extrusion occurs when chemical reaction takes place in the extruder. Main advantage of reactive extrusion is the absence of solvents as reactive medium. In the present invention, it has been surprisingly found that a novel kind of modified polyester composition can be produced through reactive extrusion.

In addition, use of melt compounding process through reactive extrusion provides effective mixing and even heat distribution, which enables efficient reaction between the silane and the polyester, wherein a silane modified polyester composition is formed.

In a preferred embodiment, the polysiloxane mixture is prepared by pre-treating a silane mixture prior to the reaction with the polyester blend. By mixing thus produced polysiloxane mixture and polyester, as a result, a material is achieved which is generally homophasic.

In addition, the present invention concerns the composition obtained by the above described method and uses of such composition.

In particular, the present invention is characterized by what is stated in the independent claims. Some specific embodiments are defined in the dependent claims.

Several advantages are reached using the present invention. Among others, the method of the invention preferably provides a bio-based and recyclable material composition. The material composition of the present invention is generally homophasic. The silane modified polyester composition of the present invention exhibit improved chemical resistance and mechanical properties, especially strength and toughness. It also exhibits good fire-retardant properties. Further, the material has better moisture resistance than for example basic PLA, making it more suitable for variety of applications as well as better suitable for recycling processes.

In addition, the present method is environmentally friendly, since it enables formation of the silane modified polyester composition without excessive use of solvents due to the use of the melt compounding through reactive extrusion, since the reactive extrusion enables processing of different viscosities, wherein dissolution of the polyester in solvent is not needed. Overall, reactive extrusion offers high flexibility enabling a continuous process with quick reaction times and short residence time but also an economic production of small amounts of special material.

The material composition of the present invention can be processed with conventional processing techniques, such as injection moulding and extrusion.

EMBODIMENTS

The present invention relates to a method for forming a modified polyester, in particular a bio-polyester, composition in a melt compounding process.

In the context of the present invention the terms "bio" and "biobased" relates to polymers produced from natural sources either chemically synthesized from a biological material or entirely biosynthesized by living organisms.

In particular, the present invention relates to a method for forming a silane modified polyester composition, in particular a biobased, silane modified polyester composition. The method comprises providing a polyester blend and a polysiloxane mixture, mixing the polyester blend and the polysiloxane mixture and, finally, reacting the polyester blend and the polysiloxane mixture through reactive extrusion in a melt compounding process.

According to one embodiment, the method comprises providing one or several different polyesters, providing a polysiloxane mixture, mixing the one or several different polyesters and the polysiloxane mixture, and reacting the one or several different polyesters and the polysiloxane mixture through reactive extrusion in a melt compounding process.

According to one embodiment, the polyester blend and the polysiloxane mixture can be mixed in a separate vessel prior to feeding into the extruder, wherein the components are fed into the extruder together.

According to another embodiment, the polyester blend and the polysiloxane mixture can be mixed in the extruder, i.e. the components can be fed separately into the extruder.

According to a preferred embodiment, the polyester blend is provided in a solid form, preferably as pellets. The pellets are typically dried prior to mixing with the polysiloxane mixture or prior to feeding into the extruder because polyesters typically absorb some moisture from air, which could cause decomposition of the material during processing in high temperatures.

The polyester blend comprises one or several different polyesters. For example, two different polyesters can be combined. According to one embodiment, the polyester blend comprises polyesters selected from the group of polylactic acid, polylactide, polybutylene succinate, polyhydroxy alkanoate, polyhydroxybutyrate, suberin and combinations thereof.

According to a preferred embodiment, the polyester is polylactic acid. Preferably, at least 80 wt. %, more preferably at least 90 wt. % of the polyesters are polylactic acids.

According to one embodiment, part of the polyester in the polyester blend can be replaced by polyethylene (PE), preferably biobased PE, or polyethylene terephthalate (PET), preferably biobased PET, or polypropylene (PP), preferably biobased PP, or a thermoplastic polyurethane (TPU), preferably a biobased TPU, or a polyamide (PA), preferably a biobased PA, or a cellulose ester, such as cellulose acetate (CA), cellulose acetate butyrate (CAB) and cellulose acetate propionate (CAP), or a mixture thereof. Preferably, amount of the PE, PET, PP, TPU, PA, cellulose ester or a mixture thereof in the polyester blend is at most 49 wt. %, for example 5-35 wt. %, more preferably 10 to 20 wt. %, of the total weight of the polyester blend. PE, PET, PP, TPU, PA and/or cellulose ester can be used to increase elasticity and mechanical properties of the composition.

According to one embodiment, if the polyester blend comprises more than one type of polyester, the polyester blend can be formed by melt compounding the polyesters into a one compound or at least complex. In this case, the polyesters are preferably dried overnight prior to melt compounding and then subjected into an extrusion using an extrusion temperature of about 200° C. with a screw speed of about 55-65 rpm or preferably about 55-350 rpm. According to one embodiment, a stereocomplex polyester is obtained.

According to another embodiment, the different polyesters are mixed manually with each other either prior to feeding into the extruder or in the extruder.

The same applies to the optional polyethylene, polyethylene terephthalate, polypropylene, thermoplastic polyurethane, polyamide and cellulose ester, i.e. those can be melt compounded with the polyesters into a one compound or at least complex in a separate melt compounding step, or it can be manually mixed with polyesters prior to feeding into the extruder on in the extruder.

Thus, according to one embodiment one or several separate polyester blends can be used, which are then mixed in the extruder.

The melting temperature of the polyester used in the present invention is typically in the range of 40-300° C., preferably in the range of 80-200° C., most preferably in the range of 100-180° C.

Preferably, the polyester blend has a melt flow index in the range of 1 g/10 min to 50 g/10 min, preferably in the range of 5 g/10 min to 25 g/10 min, for example a melt flow index of 10 g/10 min. The melt flow indexes being measured by a measurement method comprising loading the plastic polyester granules into a capillary being at temperature of 190° C. A piston and weight of 2.16 kg are placed on top of the granules. Under effect of the weight, the molten polyester is extruded out of the capillary over a period of time, giving the melt flow index.

According to a preferred embodiment the polysiloxane mixture is provided in a liquid form. The term "liquid form" in the present invention also comprises a solution. Thus, according to the present invention, material is in a liquid state if it is a liquid as such or dissolved, or at least dispersed, in a medium, preferably in a solvent.

The polysiloxane mixture can comprise either modified or unmodified silanes.

According to a preferred embodiment, the polysiloxane mixture is prepared by pre-treating a silane mixture. Pretreatment significantly improves the reactivity of the silanes, wherein the formed polysiloxane mixture more efficiently reacts with the polymer matrix during melt compounding. According to one embodiment the polysiloxane mixture is formed by mixing one or several different silane monomers, preferably at room temperature.

According to one embodiment, the polysiloxane mixture is made of silane monomers having at least one functional group. Preferably, the monomers are selected from the group of methyltriethoxysilane (MTEOS), dimethyldiethoxysilane (DMDEOS), 3-glycidoxypropyl-trimethoxysilane (GPTMS), bis(triethoxysilyl)ethane (BTESE), methyltrimethoxysilane (MTMS), phenyltrimethoxysilane (PTMS) and (3-aminopropyl)triethoxysilane (APTES), and combinations thereof.

According to another embodiment the polysiloxane mixture is made of silane monomers selected from the group of triethoxysilane, trimethoxysilane, ethyltrimethoxysilane, ethyltriethoxysilane, methyltrimethoxysilane, methyltriethoxysilane, tetraethoxysilane, tetramethoxysilane, dimethyldiethoxysilane, dimethyldimethoxysilane, methyldiethoxyvinylsilane, 1,2-bis(triethoxysilyl)ethane, vinyltrimethoxysilane, vinyltriethoxysilane, vinylmethyldimethoxysilane, phenyltrimethoxysilane, n-butyltriethoxysilane, n-octadecyltriethoxysilane, acryloxypropyl-trimethoxysilane, allyltrimethoxysilane, aminopropyltrimethoxysilane, methacryloxypropyltriethoxysilane, methacryloxypropyltrimethoxysilane, 3-glysidoxypropyltrimethoxysilane, diphenylsilanediol, 1,2-bis(trimethoxysilyl)methane, 1,2-bis(trimethoxysilyl)ethane, epoxycyclohexylethyltrimethoxysilane, 1-(2-(Trimethoxysilyl)ethyl)cyclohexane-3,4-epoxideglycidylmethacrylate and mixtures thereof. These can be used alone, in combination with each other or together with the above-mentioned silane monomers.

According to one embodiment at least part of the silane monomers are monomers with a functional group. Preferably at least 50 mol-%, preferably at least 70 mol-%, more preferably at least 90 mol-%, of the monomers have a functional group.

According to one embodiment, at least 50 mol-%, preferably at least 70 mol-%, more preferably at least 90 mol-%, of the silane monomers are selected from the group of di- and trifunctional silanes comprising methyltriethoxysilane (MTEOS), dimethyldiethoxysilane (DMDEOS), and combinations thereof. These monomers are especially reactive and compatible with the polyester matrix and they also provide improved chemical resistance.

According to one embodiment all of the silane monomers are selected form the group of di- and trifunctional silanes comprising methyltriethoxysilane (MTEOS), dimethyldiethoxysilane (DMDEOS), and combinations thereof.

Thus, according to one embodiment of the present invention the polysiloxane mixture is prepared by pre-treating a silane mixture comprising any of the above-mentioned silane monomers.

According to a preferred embodiment, the silane mixture is pre-treated, i.e. the polysiloxane mixture is formed, prior to mixing with the polyester blend.

Preferably, the silane monomers of the silane mixture are hydrolyzed in the pre-treatment process. In the hydrolyzation, for example possible ethoxy and methoxy groups of the silane reacts to hydroxyl (OH) groups, i.e. silanol, which can further react and form for example dimers and trimers with other siloxanes or silanols in the mixture, and which hydroxyl groups later react with the polymer matrix as well.

Thus, according to one embodiment, the polysiloxane mixture can be comprised of silanes, siloxane dimers or oligomers, or any mixture of these.

Thus, according to one embodiment, the polysiloxane mixture is prepared in a liquid state by hydralization and condensation polymerization of the corresponding monomers in order to obtain a polymer having a siloxane backbone by repeating —Si—O—Si— units. The properties, such as molecular weight, of the forming siloxanes can be controlled by the hydrolyzation and condensation conditions. By varying the conditions, different structures, such as linear, branched and more branched structures, are formed. The condensation degree of the siloxanes can also be adjusted to an appropriate level.

According to one embodiment pH and temperature conditions can be used to affect the properties of the forming polysiloxane mixture. Generally, alkaline conditions favor condensation over hydrolysis. By changing the pH conditions and temperature, it is possible to "manipulate" the polysiloxane compound structure and its reactivity. For example, more OH-groups can be introduced into the structure to increase the reactivity of the compound.

According to one embodiment, the polysiloxane mixture can comprise partially or completely condensed polysiloxane polymer, the polymer having at least one functional group capable to react with the polyester.

The hydrolysis of the corresponding monomers can be performed in acidic, alkaline, or neutral conditions.

According to one embodiment, the silanes are hydrolyzed with an aqueous acid solution, wherein the acid is preferably an organic acid. The content of the acid in the aqueous acid solution is typically in the range of 0.5 to 5 mol-%, for example 1 mol-%, of the aqueous acid solution.

One or more organic acids can be used at the same time.

The acid acts as catalyst during the hydrolyzation reaction. In addition, it improves compatibility of the polysiloxane with the polymer matrix, i.e. the polyester, because the acid can also react with the polyester.

According to a further preferred embodiment, the organic acid comprises monomeric organic acids, wherein in melt compounding the polyester is coupled to the polysiloxane at least partially using these monomeric organic acids. Thus, the organic acid may be bound to the polymer backbone, wherein no harmful acids remain free.

According to an even further preferred embodiment, the organic acid used is multifunctional, in particular difunctional, wherein it can react from its both ends with the polysiloxane and/or the polyester. Preferably, the organic acid has groups capable of reacting with terminal groups of at least the polyester.

According to one embodiment, the organic acid monomers react with the monomers corresponding to the polysiloxane polymer, and thus becomes part of the formed polysiloxane.

According to one embodiment, the polysiloxane mixture is formed in the presence of an acid selected from the group of inorganic acids, comprising nitric acid, hydrochloric acid, sulfuric acid, phosphoric acid and boric acid, or from the group of organic acids, comprising lactic acid, acetic acid, formic acid, citric acid, oxalic acid, uric acid, itaconic acid, fumaric acid, succinic acid, biosuccinic acid, gluconic acid, glutamic acid, malic acid, maleic acid, 2,5-furan dicarboxylic acid, 3-Hydroxypropionic acid, glucaric acid, aspartic acid, levulinic acid and combinations thereof.

According to a preferred embodiment, the acid is multifunctional organic acid, such as levulinic acid, succinic acid, malic acid, maleic acid, adipic acid, sebacic acid or any combination thereof. Preferably, the acid is succinic acid, more preferably biosuccinic acid. Biosuccinic acid is renewable alternative for traditional biosuccinic acid, the biosuccinic acid typically being produced via a fermentation process from sustainable biomass. Biosuccinic acid has found to be especially compatible with polyesters. According to one embodiment, a biosuccinic acid solution is formed by diluting 1 mol-% of biosuccinic acid in deionized water.

Also, one or more organic acids can be used at the same time. According to one embodiment, at least one organic acid is difunctional, such as oxalic acid, malonic acid, succinic acid, DL-malic acid, fumaric acid, maleic acid, citraconic acid, itaconic acid, L-(+)-tartaric acid, glutaric acid, adipic acid, pimelic acid, suberic acid, azelaic acid. According to another embodiment at least two, for example 2 or 4 organics acids are difunctional. According to a further embodiment, the difunctional acid or difunctional acids are used in combination with one or more monofunctional acids.

According to one embodiment at least 50 mol-%, preferably at least 60 mol-%, more preferably at least 80 mol-%, of the organic acids are difunctional.

Thus, according to a preferred embodiment, the silanes are hydrolyzed with an aqueous organic acid solution, wherein the organic acid is at least mainly difunctional organic acid, such as succinic acid, optionally combined with other organic acid, such as monofunctional organic acid, as an auxiliary acid.

Thus, according to one embodiment, the polysiloxane mixture is prepared by pre-treating a silane mixture by mixing the silanes and an aqueous acid solution, preferably at room temperature, Preferably, the polysiloxane mixture is prepared by adding an aqueous acid solution, such as aqueous biosuccinic acid solution, gradually to a reaction vessel containing silanes. The mixture is preferably mixed for more than an hour, preferably more than for 6 hours, for example for 12 hours.

According to another embodiment the polysiloxane mixture is prepared by mixing the silanes and DI water by stirring at room temperature. The stirring time may vary; typically it is more than an hour, preferably more than 6 hours, for example 12 hours.

According to one embodiment, the weight ratio between the aqueous acid solution and silane is in the range of 1:20 to 2:3, preferably in the range of 1:10 to 1:3, for example 3:10.

According to one embodiment, the polysiloxane mixture can comprise one or several different types of siloxanes. It is also possible to use more than one separate polysiloxane mixtures. Thus, more than one type of polysiloxanes can be mixed with each other prior to mixing with the polyester blend. According to another embodiment, two or more polysiloxane mixtures can be formed and then added separately into the polyester blend.

According to a preferred embodiment, the polysiloxane mixture being in a liquid form is mixed with polyester blend being in a solid form, preferably as pellets, i.e. the polysiloxane mixture and the polyester blend are mixed prior to melt compounding, wherein the liquid polysiloxane mixture stays on the surface of the polyesters and the reactions occur during the extrusion once the polyester melts.

According to another embodiment, the polysiloxane mixture, being in a liquid form, is mixed with a melted polyester using liquid feeding, wherein reactions occur during extrusion once the components mix with each other.

Thus, according to one embodiment of the present invention, the present method for forming a silane modified polyester composition, in particular a biobased silane modified polyester composition, comprises the steps of
  providing a polyester blend,
  providing a polysiloxane mixture,
  mixing the polyester blend and the polysiloxane mixture, and
  reacting the polyester blend and the polysiloxane mixture through reactive extrusion in a melt compounding process.

Material composition of the present invention is based on the interactions between the inorganic and organic species. In the material, the polysiloxane and the polyester reacts by forming chemical bonds, such as covalent bonds with each other, during the reactive extrusion. According to one embodiment, also the acid optionally used as a catalyst can form chemical bonds with the polysiloxane and/or the polyester.

According to a preferred embodiment, the material composition of the present invention is homophasic. Term "homophasic" in the present invention stands for a material of uniform composition throughout that cannot be mechanically separated into different materials.

According to one embodiment, the polysiloxane content is 0.1 to 20 wt. %, preferably 0.1 to 10 wt. %, of the weight of the whole polyester composition.

According to one embodiment, the weight ratio between the polyester and the polysiloxane in the material composition is 1:99-99:1, for example 10:99 or 99:10 or 20:80 or 80:20 or 30:70 or 70:30 or 50:50.

According to a preferred embodiment, the weight ratio between the polyester and the polysiloxane in the material composition is in the range of 80:20 to 99.9:0.1, for example 99.5:0.5.

According to one embodiment, the composition of the present invention further comprises a filler, especially inorganic filler, such as ashes, minerals, mineral sludges, clays, ceramics and other inorganics comprising for example calcium carbonate, kaolin, talc, gypsum, chalk, mica, wollastonite, glass, silica, alumina, titania and other inorganic oxides, crushed masonry, concrete and other stone and sand like materials, diatomite, metal hydrates, such aluminum hydrates, calcium hydrate, geopolymers and alike.

According to one embodiment, the composition of the present invention further comprises an additive, especially plasticizer, such as glycerol, polyethylene glycol, triethyl citrate, tributyl citrate, acetyl tributyl citrate, vegetable oil, such as soybean oil, linseed oil, tall oil, castor oil, canola, or their modification, such as maleated, acrylated, vinylated, succinated, epoxidized, hydroxylated vegetable oil or other vegetable ester oil or resin including epoxidized soybean oil, maleated soybean oil, epoxidized linseed oil, or any combination thereof.

According to one embodiment, the composition of the present invention further comprises an additive, especially lubricant, including stearates such as calcium stearate and magnesium stearates and natural waxes, such as carnauba wax, soybean wax, beeswax, sugarcane wax, cassava wax, candelilla wax, rice bran wax, berry wax, myrica fruit wax and laurel wax, or any mixture thereof.

According to one embodiment, the composition comprises organic fillers and colorants, such as wood, and plant-based materials and parts and side streams thereof, including beans, for example soybean, bean hull, wheat hull, and rice husk, seaweed, algae, natural resins and gums, carbon, carbon black, biocarbon, woad, willow and other tree bark, onion skin and other vegetable skins, lemon, turmeric root, all natural fibres such as cotton, hemp, flax, pulp, woodfibres; as well as components thereof such as lignocellulose, lignin, suberin, polysaccharides, including natural polysaccharides, such as cellulose, starch and hemicellulose, nanocellulose, and derivatives thereof; and any combinations thereof.

According to one embodiment, the composition of the present invention further comprises a chain extender and/or a cross-linking agent, such as peroxide, epoxy, amine or acrylic functionalized chain extenders. In a preferred embodiment the amount of chain extender/cross-linking agent, especially peroxide, is less than 0.5 wt. %, preferably 0.01-0.2 wt. %, calculated from the total weight of the composition. Chain extenders/cross-linking agents can be used to increase the viscosity of the composition. Higher viscosity, i.e. less flowable composition, may be preferred in some applications, such as for example in film applications. Further, chain extenders/cross-linking agents increase durability of the composition by the bonds formed between the polymer chains. According to a preferred embodiment such components are added to the composition of the present invention after the silane modified polyester is formed in a separate process step. According to another embodiment, such components can be added to the composition at the end phase of the reactive extrusion process, wherein the siloxane and polyester are already mainly reacted.

The polyester blend and the polysiloxane mixture are reacted into a composition through reactive extrusion in a melt compounding process. The components do not react until the polyester is at least essentially melted in the extrusion phase.

The extrusion in a melt compounding process according to the present invention comprises feeding the components into the extrudes, heating up the components, or at least the polyester, to start the chemical reaction. As already mentioned above, the polysiloxane mixture can be mixed with the polyester blend either prior to feeding into the extruder, or they can be mixed in the extruder once the polyester blend has melted by liquid supply of the polysiloxane mixture.

Typically, the extruder reactor used in the present invention is a twin screw extruder, preferably a co-rotating twin screw extruder. Twin screw extruder has excellent mixing capability at the molecular level, which enables production of homogeneous material composition.

Preferably, the reactive extrusion is performed at a temperature higher than the melting temperature of the polyester blend. According to a preferred embodiment, the reactive extrusion is performed at a temperature of at least 190° C., for example at about 200° C. The screw speed used in the extrusion is preferably in the range of 50 to 350 rpm or 50 to 200 rpm, more preferably in the range of 50 to 200 rpm or 50 to 100 rpm, for example 150 rpm or 65 rpm.

During the extrusion, the components are compounded into a silane modified polyester composition.

According to one embodiment, the mixture is compounded in the extrusion into strands. According to a further embodiment the strands are optionally cooled in water bath. Finally, the cooled strands can be pelletized into granules.

According to one embodiment, the method of the present invention can be repeated for the silane modified polyester composition formed in the present invention in order to further modify the properties of the composition. For example, according to one embodiment of the present invention, the silane modified polyester composition can be combined with another polyester blend.

According to one embodiment, the method of the present invention can comprise foaming the obtained polyester composition to obtain a foamed silane modified polyester composition. The composition can be foamed by any known foaming method, such as by chemical or physical foaming using for example foam extrusion and carbon dioxide, nitrogen, pentane, or any combination thereof as blowing agent.

The present invention also relates to a, preferably biobased, silane modified polyester composition obtained by the method of the present invention.

Further, the present invention relates to the use of the, preferably biobased, silane modified polyester composition obtained by the method of the present invention. The materials are suitable for injection molding and extrusion, in particularly they are suitable to be used as a packaging material, for example in cosmetic packaging.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The following non-limiting examples are intended merely to illustrate the advantages obtained with the embodiments of the present invention.

EXAMPLES

Example 1

Preparation of Mixture 1 (Polysiloxane Mixture)

57.5 g of aqueous biosuccinic acid solution (1 wt.-% of biosuccinic acid was diluted in deionized water) was gradually added to 425 g of methyltriethoxysilane. 32.5 g of ethoxytrimethylsilane and 15.5 g of bis(triethoxysilyl)ethane. The solution was mixed 6 hours at room temperature prior to use.

Preparation of Composition 1 (Silane Modified Polyester)

Commercial grade polylactic acid (Luminy L130) having a melt flow index (MFI) of 10 g/10 min (190° C., 2.16 kg) was dried overnight in circulated air oven at 60° C. and then mixed with Mixture 1 in weight ratio of 99.5:0.5 prior to melt compounding. The obtained mixture was melt compounded using a twin-screw extrusion with extrusion temperature of 200° C. and screw speed of 65 rpm. The compounded material was extruded into strands, cooled in water bath and pelletized into granules.

Example 2

Preparation of Composition 2 (Silane Modified Polyester)

Composition 1 of Example 1 was mixed with commercial grade polybutylene succinate (BioPBS FZ71) having MFI of 22 g/10 min (190° C., 2.16 kg) in weight ratio of 90:10. The prepared mixture was melt compounded by using a twin-screw extrusion. Extrusion was performed at a temperature of 200° C. with a screw speed of 65 rpm. The mixture was extruded into strands, cooled in water bath and pelletized into granules.

Example 3

Preparation of Polyester Blend

95:5 w/w mixture of commercial grade poly-lactic acid (Luminy L130) having a MFI of 10 g/10 min (190° C., 2.16 kg) and poly-D-lactic acid (Luminy D120) having a MFI of 10 g/10 min (190° C., 2.16 kg) was dried overnight in circulated air oven at 60° C. and then melt compounded to a stereocomplex polylactic acid using 200° C. extrusion temperature and screw speed of 65 rpm. The obtained mixture was pelletized and dried overnight in circular air oven at 60° C.

Preparation of Composition 3 (Silane Modified Polyester)

The polyester blend thus obtained was mixed with the Mixture 1 of Example 1 in weight ratio of 99.5:0.5. Then it was melt compounded using twin-screw extrusion at temperature of 200° C. with a screw speed of 65 rpm. The compounded material was extruded into strands, cooled in water bath and pelletized into granules.

Example 4

Preparation of Mixture 2 (Polysiloxane Mixture)

2.3 g of aqueous biosuccinic acid solution (1 wt.-% of biosuccinic acid was diluted in deionized water) was gradually added to 10 g of dimethyldiethoxysilane. Obtained solution was mixed for 12 hours at room temperature prior to use.

Preparation of Composition 4 (Silane Modified Polyester)

Commercial grade polylactic acid (Luminy L130) having a melt flow index of 10 g/10 min (190° C., 2.16 kg) was dried overnight in circulated air oven at 60° C. and then mixed with Mixture 2 in weight ratio of 98:2. The obtained mixture was melt compounded by using a twin-screw extrusion at extrusion temperature of 200° C. and with screw speed of 65 rpm. The compounded material was extruded into strands, cooled in water bath and pelletized into granules.

Example 5

Preparation of Mixture 3 (Polysiloxane Mixture)

6.66 g of methyltriethoxysilane (MTEOS) and 5.54 g of dimethyldiethoxysilane (DMDEOS) was mixed in a baker. The 2.68 g of aqueous biosuccinic acid solution (1 wt.-% of biosuccinic acid was diluted in deionized water) was gradually added to the mixture. The mixture was mixed for 12 hours at room temperature prior to use.

Preparation of Composition 5 (Silane Modified Polyester)

Commercial grade polylactic acid (Luminy L130) having a melt flow index of 10 g/10 min (190° C., 2.16 kg) was dried overnight in circulated air oven at 60° C. and then mixed with Mixture 3 in weight ratio of 98:2. The obtained mixture was melt compounded using a twin-crew extrusion at a temperature of 200° C. with screw speed of 65 rpm. The compounded material was extruded into strands, cooled in water bath and pelletized into granules.

Example 6

Preparation of Mixture 4 (Polysiloxane Mixture)

2.87 g of aqueous biosuccinic acid solution (2 wt.-% of biosuccinic acid was diluted in deionized water) was gradually added to 10 g of methyltriethoxysilane and 1.3 g of phenyltrimethoxysilane. The solution was mixed for 4 hours at 40° C. prior to use.

Preparation of Composition 6 (Silane Modified Polyester)

Commercial grade polylactic acid (Luminy L130) having a melt flow index of 10 g/10 min (190° C., 2.16 kg) was dried overnight in circulated air oven at 60° C. Then, 1 wt. % of Mixture 4 and 1 wt. % of Mixture 2 of Example 4 were added to the PLA prior to melt compounding. Then the compound was melt compounded by using a twin-screw extrusion at temperature of 200° C. with screw speed of 65 rpm. The compounded material was extruded into strands, cooled in water bath and pelletized into granules.

Example 7

Preparation of Composition 7 (Silane Modified Polyester)

Commercial grade polylactic acid (Luminy L130) having a melt flow index of 10 g/10 min (190° C., 2.16 kg) was dried overnight in circulated air oven at 60° C. The PLA granules were mixed with epoxidized soybean oil (ESBO) and with Mixture 1 of Example 1 in weight ratio of 94.5:5:0.5. The mixture was compounded using twin-screw extrusion at a temperature of 200° C. with screw speed of 65 rpm. The compounded material was extruded into strands, cooled in water bath and pelletized into granules.

Example 8

Film samples having thickness of approximately 0.2 mm were prepared by compression molding (190° C., 100 kN Force) of the silane modified polyesters of the previous examples as well as acrylonitrile butadiene styrene (ABS)

and poly (1-tactic acid) (PLLA) reference materials. Samples were cut from the films and their tensile properties were measured according to ISO 527-3, which describes a test method for the determination of the tensile properties of plastic films and sheets. Specimen type 5 and 5 mm/min test speed were used. The results are shown in Table 1.

TABLE 1

Mechanical properties of prepared silane modified polyester compositions with the properties of ABS and PLLA reference materials.

| Material | Tensile strength (MPa) | Tensile modulus (GPa) | Elongation at Break (%) |
|---|---|---|---|
| ABS | 33.5 ± 1.5 | 1.32 ± 0.05 | 8.4 ± 4.7 |
| PLLA | 52.6 ± 2.8 | 1.80 ± 0.06 | 5.6 ± 1.0 |
| Example 1 | 45.2 ± 2.7 | 2.09 ± 0.06 | 4.2 ± 1.0 |
| Example 2 | 41.3 ± 3.1 | 1.85 ± 0.07 | 27.6 ± 12.2 |
| Example 4 | 51.2 ± 1.0 | 1.99 ± 0.02 | 4.1 ± 0.6 |
| Example 5 | 46.4 ± 4.6 | 1.85 ± 0.13 | 3.2 ± 0.2 |
| Example 6 | 49.9 ± 2.6 | 2.01 ± 0.04 | 3.4 ± 0.4 |
| Example 7 | 47.5 ± 1.3 | 1.89 ± 0.07 | 74.9 ± 31.0 |

The results in Table 1 shows that the silane modified polyesters have 23% to 53% higher tensile strength than the ABS reference and, in the case of Example 4 and Example 6, similar strengths as the PLLA reference. The elastic moduli of the samples are 40% to 58% higher than the modulus of ABS reference, and 3% to 16% higher than the modulus of PLLA reference. For Examples 2 and 7, the toughness of the samples is improved as the elongation at break values are 228% (27.6%) and 791% (74.9%) higher than those of ABS reference.

Example 9

Properties of the silane modified polyesters according to the previous Examples were investigated and compared to reference materials ABS and PLLA. The results of each experiment are presented in FIGS. 1 to 4.

Figure 1:
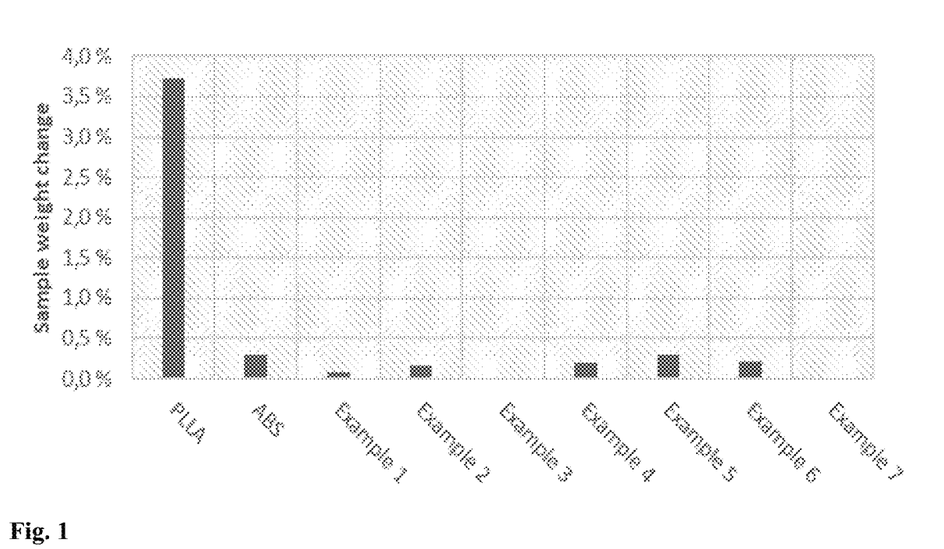
FIG. 1 illustrates the results of the first experiment investigating changes in sample weight.

In the first experiment changes in sample weight after 4 h exposure to water vapor in 100° C. were investigated. Disc shaped samples (approximately 5 g per sample) were exposed to water vapor for 4 h, dried at 60° C. for 12 h, and weighed. The change in sample weight is calculated as change in mass divided by initial mass and multiplied by 100. The results are shown in FIG. 1, from which it can be seen that the silane modified polyesters (Examples 1-7) have much lower moisture absorption (0% to 0.3%) than the reference PLLA (3.7%), and even lower moisture absorption than ABS (0.3%) in the case of Examples 1-4 and 6-7.

Figure 2:
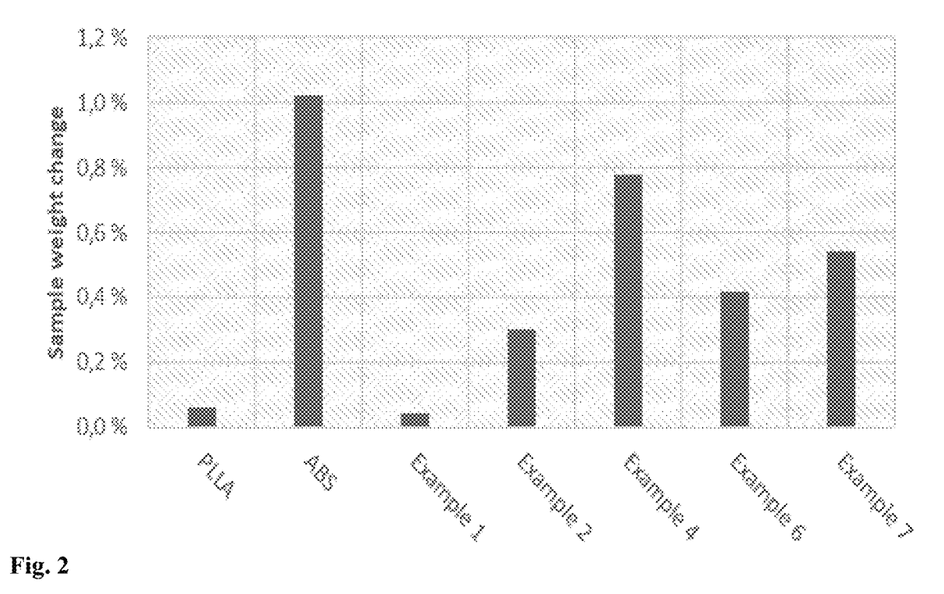
FIG. 2 illustrates the results of the second experiment investigating changes in sample weight.
Figure 3:
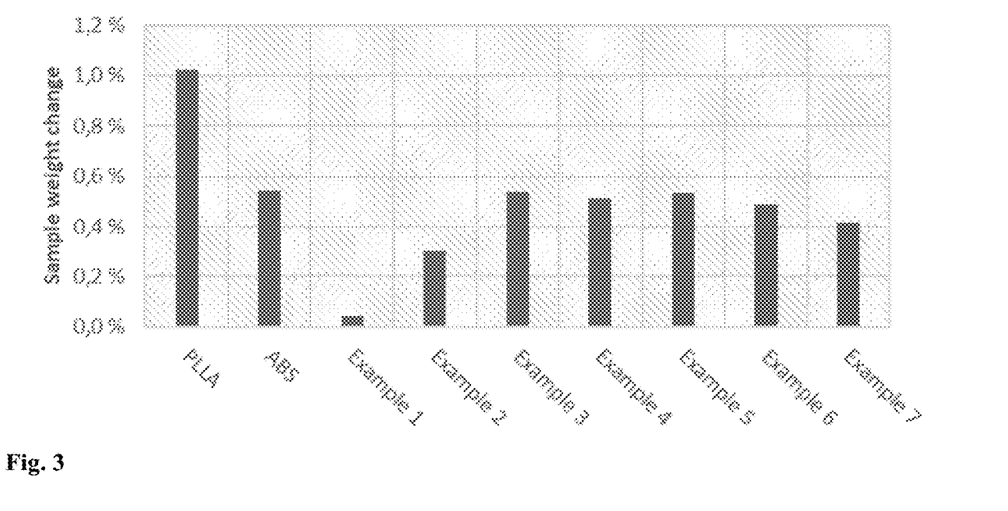
FIG. 3 illustrates the results of the third experiment investigating changes in sample weight.

In the second experiment changes in sample weights after 72 h exposure to 1 M NaOH in room temperature were investigated. Disc shaped samples (approximately 5 g per sample) were submerged in NaOH solution for 72 h, dried at 60° C. for 12 h, and weighed. The change in sample weight is calculated as change in mass divided by initial mass and multiplied by 100. The results are shown in FIG. 2. For the ABS reference, 1% weight change was observed whilst for the silane modified polyesters of the present invention the weight changes were lower, 0.04-0.78%. The weight change was the lowest for the Example 1 (0.04%), which is similar to the weight change of the PLLA reference sample (0.06%).

In the third experiment changes in sample weights after 168 h exposure to perfume simulant solution consisting of 80 wt. % of ethanol, 10 wt.-% of turpentine, and 10 wt.-% of phthalate were investigated at room temperature. Disc shaped samples (approximately 5 g per sample) were submerged in perfume simulant for 168 h, dried in 60° C. for 12 h, and weighed. The change in sample weight is calculated as change in mass divided by initial mass and multiplied by 100. The results are shown FIG. 3. After exposure to the perfume simulant solution the weight change of PLLA and ABS references were 1.0% and 0.5%, respectively. The weight change was lower or in the same level as the ABS reference for the silane modified polyesters, namely between 0.04% and 0.5%. Examples 1 and 2 were the most durable against exposure for the perfume simulant having weight changes of 0.04% and 0.3%, respectively.

Figure 4:
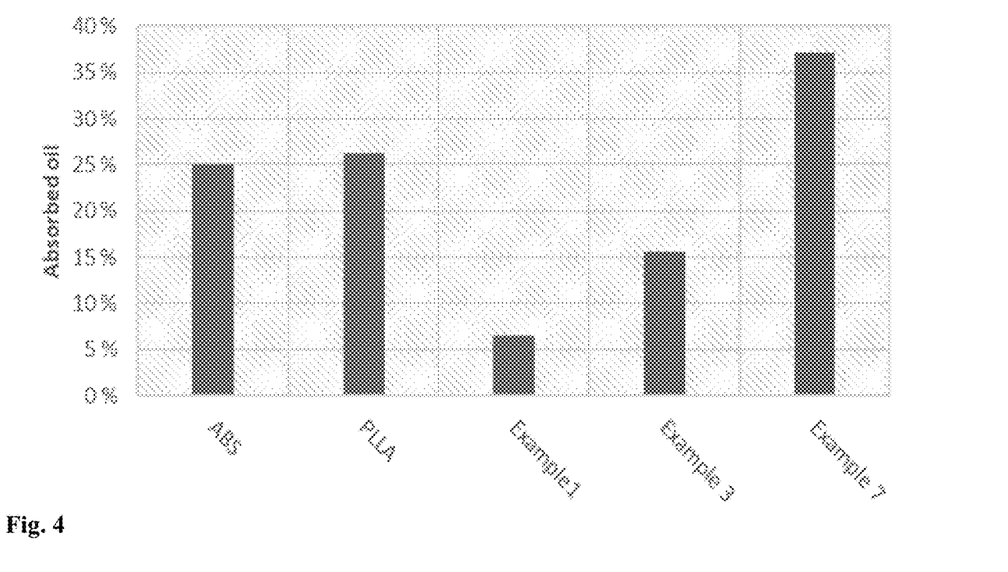
FIG. 4 illustrates the results of the fourth experiment investigating changes in sample weight.

In the fourth experiment absorption of essential oil (100% lavender oil, 72 h at room temperature) was investigated. 3 to 5 drops of essential oil were placed carefully on top of a disc shaped sample. After 72 h, the sample was thoroughly wiped with a paper towel to remove the oil and then weighed. The amount of absorbed oil was calculated as a change in sample mass divided by the initial mass of the added essential oil and multiplied by 100. The results are shown in FIG. 4. The amount of absorbed oil was 25% and 26% for the ABS and PLLA references, respectively. For the silane modified polyesters in Examples 1 and 3 the oil absorption was lower, 7% (Example 1) and 16% (Example 3). The oily component in Example 7 on the other hand resulted in higher oil absorption of the sample, 37%.

Example 10

Preparation of Mixture 5 (Polysiloxane Mixture)

42.5 g of aqueous levulinic acid solution (1 wt.-% of levulinic acid was diluted in deionized water) was gradually added to a mixture of 350 g of methyltriethoxysilane, 127.5 g of dimethyldiethoxysilane and 12.5 g of methoxytrimethylsilane. The solution was mixed 12 hours at room temperature prior to use.

Preparation of Composition 8 (Silane Modified Polyester)

Commercial grade polylactic acid (Luminy L130) having a melt flow index of 10 g/10 min (190° C., 2.16 kg) was dried overnight in circulated air oven at 60° C. The PLA granules with Mixture 5 in weight ratio of 98:2. The mixture was compounded using twin-screw extrusion at a temperature of 200° C. with screw speed of 65 rpm. The compounded material was extruded into strands, cooled in water bath and pelletized into granules.

Example 11

Preparation of Mixture 6 (Polysiloxane Mixture)

75 g of aqueous maleic acid solution (0.5 wt.-% of maleic acid was diluted in deionized water) was gradually added to a mixture of 375 g of dimethyldiethoxysilane and 32.5 g of 3-glysidoxypropyltrimethoxysilane. The solution was mixed 2.5 hours at room temperature. After mixing, the formed alcohols were evaporated using rotary evaporator prior to use.

Preparation of Composition 9 (Silane Modified Polyester)

Commercial grade polylactic acid (Luminy L175) having a melt flow index of 3 g/10 min (190° C., 2.16 kg) was dried overnight in circulated air oven at 60° C. The PLA granules with Mixture 6 in weight ratio of 98:2. The mixture was compounded using twin-screw extrusion at a temperature of 200° C. with screw speed of 100 rpm. The compounded material was extruded into strands, cooled in water bath and pelletized into granules.

Example 12

Preparation of Mixture 7 (Polysiloxane Mixture)

67 g of aqueous biosuccinic acid solution (1.3 wt.-% of biosuccinic acid was diluted in deionized water) was gradually added to 575 g of methyltriethoxysilane. The solution was mixed 12 hours at room temperature prior to use.

Preparation of Composition 10 (Silane Modified Polyester)

Commercial grade polylactic acid (Luminy L130) having a melt flow index (MFI) of 10 g/10 min (190° C., 2.16 kg) was dried overnight in circulated air oven at 60° C. and then mixed with Mixture 7 in weight ratio of 98:2 prior to melt compounding. The obtained mixture was melt compounded using a twin-screw extrusion with extrusion temperature of 200° C. and screw speed of 70 rpm. The compounded material was extruded into strands, cooled in water bath and pelletized into granules.

INDUSTRIAL APPLICABILITY

The present method can be used to produce a silane modified polyester composition, in particular a biobased silane modified polyester composition, and generally for replacement of conventional methods of producing silane modified polymers.

In particular, the present material composition is useful replacement of fossil-based thermoplastics, such as ABS in objects manufactured by injection molding or melt extrusion. The composition can be used for example as consumer goods, in cosmetic or food packaging materials (caps, lids, etc.).

CITATION LIST

Patent Literature

US20160009913A1
US20190062495A1
U.S. Pat. No. 9,109,083B2

The invention claimed is:

1. A method for forming a biobased-silane modified polyester composition, comprising the steps of:
   providing a polyester blend comprising at least one biobased polyester,
   providing a polysiloxane mixture,-mixing the polyester blend and the polysiloxane mixture, and
   reacting the polyester blend and the polysiloxane mixture through reactive extrusion in
   a melt compounding process
   wherein the polysiloxane mixture is prepared by pretreating a silane mixture by hydrolyzation and condensation polymerization of the corresponding monomers, wherein the silane mixture is hydrolyzed with an aqueous acid solution, wherein the acid is an organic acid selected from oxalic acid, malonic acid, succinic acid, biosuccinic acid, DL-malic acid, fumaric acid, maleic acid, citraconic acid, itaconic acid, L-(+)-tartaric acid, glutaric acid, adipic acid, pimelic acid, suberic acid, azelaic acid, levulinic acid, malic acid, sebasic acid, lactic acid, 3-hydroxypropionic acid, 2,5-furan dicarboxylic acid, glutamic acid, glucaric acid, and aspartic acid, such that at least 50 mol % of the organic acid is difunctional.

2. The method according to claim 1, wherein the polyester blend comprises at least two different polyesters.

3. The method according to claim 1, wherein the polyester blend is provided in a solid form.

4. The method according to claim 1, wherein the polyester blend comprises polyesters selected from the group consisting of polylactic acid, polylactide, polybutylene succinate, polyhydroxy alkanoate, polyhydroxybutyrate, suberin, and combinations thereof.

5. The method according to claim 1, wherein 5 to 35 wt. % wt. % of the total weight of the polyester in the polyester blend comprises polyethylene (PE), or polyethylene terephthalate (PET), or polypropylene (PP), or a thermoplastic polyurethane (TPU), or a polyamide (PA), or a cellulose ester, or a mixture thereof.

6. The method according to claim 1, wherein the silane mixture comprises silane monomers selected from the group consisting of methyltriethoxysilane (MTEOS), dimethyldiethoxysilane (DMDEOS), 3-glycidoxypropyl-trimethoxysilane (GPTMS), bis(triethoxysilyl) ethane (BTESE), methyltrimethoxysilane (MTMS), phenyltrimethoxysilane (PTMS) and (3-aminopropyl) triethoxysilane (APTES), and combinations thereof.

7. The method according to claim 1, wherein at least 50 mol-% of the silane monomers are selected from the group consisting of methyltriethoxysilane (MTEOS), dimethyldiethoxysilane (DMDEOS), and combinations thereof.

8. The method according to claim 1, wherein the polysiloxane content is 0.1 to 10 wt. % of the weight of the biobased-silane modified polyester composition.

9. The method according to claim 1, wherein the biobased-silane modified polyester composition further comprises:
   a filler selected from the group consisting of ashes, minerals, mineral sludges, clays, ceramics, calcium carbonate, kaolin, talc, gypsum, chalk, mica, wollastonite, glass, silica, alumina, titania, inorganic oxides, crushed masonry, concrete and other stone and sand like materials, diatomite, metal hydrates, geopolymers, and any combination thereof, and/or
   an additive selected from the group consisting of glycerol, polyethylene glycol, triethyl citrate, tributyl citrate, acetyl tributyl citrate, vegetable oil, and any combination thereof.

10. The method according to claim 1, wherein the composition further comprises:
    an organic filler or colorant, and/or
    a chain extender and/or a cross-linking agent, and/or
    a lubricant.

11. The method according to claim 1, wherein the extrusion is performed at a temperature higher than the melting temperature of the polyester blend.

12. The method according to claim 1, wherein the mixture of the polyester blend and the polysiloxane mixture is compounded in a twin-screw extrusion.

13. The method according to claim 12, wherein the screw speed in the extrusion is in the range of 50 to 350 rpm.

14. The method according to claim 12, wherein the mixture of the polyester blend and the polysiloxane mixture is compounded in the extrusion into strands which are cooled in water bath and finally pelletized into granules.

15. A biobased-silane modified polyester composition obtained by a method according to claim 1.

16. The composition according to claim 15, wherein the composition comprises a packaging material.

17. The method according to claim 1, wherein the weight ratio between the aqueous acid solution and the silane mixture is in the range of 1:10 to 1:3.

* * * * *